US004001666B2

United States Statutory Invention Registration [19]

[11] Reg. Number: H1666

Stenger-Smith et al.

[45] Published: Jul. 1, 1997

[54] METHOD OF CROSS-LINKING POLY (ETHYLENE OXIDE) AND POLY [OXYMETHYLENE-OLIGO (OXYETHYLENE)] WITH ULTRAVIOLET RADIATION

[75] Inventors: John D. Stenger-Smith, Ridgecrest, Calif.; Michael Mead Lerner, Corvallis, Oreg.; Steven Edward Sloop, Corvallis, Oreg.; John Patrick Lemmon, Corvallis, Oreg.; Andrew Leonard Tipton, Woburn, Mass.; Thomas Summer Stephens, Inyokern, Calif.

[73] Assignee: The United States of America as represented by the Secretary of the Navy, Washington, D.C.

[21] Appl. No.: 536,301

[22] Filed: Sep. 15, 1995

[51] Int. Cl.[6] ..... C08F 2/46; C08J 3/28

[52] U.S. Cl. ..... 522/3

[58] Field of Search ..... 522/3, 913, 914

[56] References Cited

U.S. PATENT DOCUMENTS

| | | | |
|---|---|---|---|
| 3,419,006 | 12/1968 | King | 128/268 |
| 3,470,078 | 9/1969 | King | 204/159.14 |
| 4,959,396 | 9/1990 | Yankov et al. | 521/61 |
| 4,970,012 | 11/1990 | Kuroda et al. | 252/62.2 |
| 5,006,187 | 4/1991 | Cook et al. | 156/244.11 |
| 5,017,382 | 5/1991 | Embrey et al. | 424/486 |
| 5,019,100 | 5/1991 | Hennink et al. | 623/6 |
| 5,037,712 | 8/1991 | Shackle et al. | 429/192 |
| 5,414,025 | 5/1995 | Allcock et al. | 522/46 |

OTHER PUBLICATIONS

Sloop,Lerner,Stephens,Tipton, Paull, and Stenger–Smith, "Cross–Linking Poly (ethylene oxide) and Poly[oxymethlene–oligo(oxyethylene)] with Ultraviolet Radiation". Journal of Applied Polymer Science, Sep. 19, 1994 pp.1563–1572.

Maccallum, Smith, and Vincent, "The Effects of Radiation–Induced Cross–linking on the Conductance of LiClO –PEO Electrolytes", Jun. 1983, pp. 307–312.

Bennett, Dembek, and Allcock, "Radiation Cross–Linking of Poly[bis (2–(2–methoxyethoxy) ethoxy) phosphazene]: Effect on Solid–State Ionic Conductivity," vol. 1, No.1, 1989. pp. 14–16.

Bartolotta, Carini, DiMarco, Romeo, and Salvato, "Anelastic relaxations and molecular motions in polymeric electrolytes," Jan. 15, 1991. pp.704–709.

*Primary Examiner*—Charles T. Jordan
*Assistant Examiner*—Meena Chelliah
*Attorney, Agent, or Firm*—Melvin J. Sliwka; Stephen J. Church

[57] ABSTRACT

Poly(ethylene oxide) (PEO) and poly[oxymethylene-oligo (oxyethylene)](PEM) disks are cross-linked by exposure to UV radiation. The rate of formation of cross-links is greatly enhanced by the presence of benzophenone, and an average cross-link density of up to 6 mol% of ethoxy units can be obtained after irradiation. The highly cross-linked polymers are insoluble in water or organic solvents and show improved physical properties for handling and the formation of free-standing films. Dynamic modulus measurements and polymer swelling are employed to characterize the polymers. Dynamic modulus measurements show that, upon irradiation, PEO and PEM become cross-linked elastomeric solids.

16 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF CROSS-LINKING POLY (ETHYLENE OXIDE) AND POLY [OXYMETHYLENE-OLIGO (OXYETHYLENE)] WITH ULTRAVIOLET RADIATION

FIELD OF INVENTION

The present invention generally relates to a method of cross-linking polyether by exposure to UV radiation. The invention specifically relates to cross-linking poly(ethylene oxide) and poly[oxymethylene-oligo(oxyethylene)] films by UV radiation and to greatly enhancing the rate of formation of cross-links by the addition of a photoinitiator.

BACKGROUND OF THE INVENTION

Salt complexes of oligo- and polyethers have been studied for use as solid polymer electrolytes in high-energy-density batteries and electrochromic devices. The highest ionic conductivities were found in completely amorphous materials that were soft and sticky, however, these materials do not readily form free-standing films.

A variety of chemical methods and gamma radiation have been utilized to form cross-links of polyethers. However, these methods were often difficult and relatively unsafe to carry out and were also costly.

A method of cross-linking poly(ethylene oxide) and poly [oxymethyleneoligo(oxyethylene)] by Ultraviolet (UV) radiation is not presently available. This method would allow cross-linking of these polymers in a relatively safe and efficient manner.

SUMMARY OF THE INVENTION

The present invention concerns a method of cross-linking poly(ethylene oxide) and poly[oxymethylene-oligo (oxyethylene)] with the use of UV radiation. The highly cross-linked polymers can be used in preparing sodium salt complexes which can be in turn used in high- energy-density batteries and electrochromic devices. The addition of a photoinitiator, such as: benzophenone; 1,2 dibenzoylbenzene; 1,3 dibenzoylbenzene; 1,4 dibenzoylbenzene; or trans, trans dibenzylidene acetone, prior to irradiation, greatly enhanced the rate of cross-linking.

Other possible applications for cross-linked poly(ethylene oxide) and poly[oxymethyleneoligo(oxyethylene) include surgical dressings, controlled drug delivery, and semipermeable membranes.

Accordingly, it is an object of the present invention to provide a method of cross-linking poly[oxymethylene-oligo (oxyethylene)] and poly(ethylene oxide) that is both safe and efficient.

Another object of the invention is to provide a method of cross-linking poly[oxymethylene-oligo(oxyethylene)] and poly(ethylene oxide) that improves their dimensional stability for ease in handling and for formation of free-standing films.

Still another object of the invention is to provide a method of cross-linking poly[oxymethylene-oligo(oxyethylene)] and poly(ethylene oxide) so that they are insoluble in water or organic solvents.

These and other objects, features and advantages will become apparent from a thorough consideration of the detailed description which follows.

DETAILED DESCRIPTION OF THE INVENTION

Poly(ethylene oxide) (PEO), molecular weight $5\times10^6$, was dissolved in a polar organic solvent, such as acetone, acetonitrile, chloroform, or dimethyl sulfoxide. A lower molecular weight PEO could also be used, but should be at least $5\times10^2$. The viscous solution was cast onto Dupont's TEFLON and dried in air. PEO was cut into the desired shape of a disk, about 0.4 mm thick, and dried at 60° C. in vacuo for 12 hours. PEO can be cut into other desired shapes, which will not effect the outcome of the cross-linking. The thickness of the disks can vary but should be no more than 5mm. The thickness of the PEO or PEM disks was dictated by the requirements for theology measurements. Disks thicker than about 0.5 mm will extend the time needed for irradiation.

Poly[oxymethylene-oligo(oxyethylene)] (PEM) can be prepared by polyetherification. A disclosed method of preparing PEM is in the article by Lemmon and Lerner in *Macromolecules* 25, 2907 (1992). A PEM of molecular weight 7.5 $10^4$ was used. A lower molecular weight PEM could also be used, but should be at least $5\times10^2$. PEM disks were then formed and dried at 60° C. in vacuo for 12 hours. PEM also can be cut into other desired shapes, which will not effect the outcome of the cross-linking. Again, disks about 0.4 mm thick were used. The thickness of the disks can vary but should be no more than 5mm. Disks thicker than about 0.5 mm will extend the time needed for irradiation. PEM and cross-linked PEM are completely amorphous at room temperature, unlike PEO and cross-linked PEO which is partially crystalline. It was unexpected that PEM should have these properties since generally polymers get stiffer with increased cross-linking.

While PEO or PEM is dissolving in the polar organic solvent a photoinitiator such as: benzophenone; 1,2 dibenzoylbenzene; 1,3 dibenzoylbenzene; 1,4 dibenzoylbenzene; or trans, trans dibenzylidene acetone can be added. The concentration of the photoinitiator benzophenone used ranged from 0.25 mol %–0.50 mol % and was reagent grade. The concentration of photoinitiator was not critical since the concentration can vary yet still achieve significant cross-linkage. The concentration was dependent on the irradiation time and the film thickness of PEO or PEM used.

Since the transmittance of the UV radiation is an exponential function of the sample thickness, the middle of the sample film receives a lower radiation dose than the faces. However, homogenous sample films can be obtained by cross-linking thin sample films with low photoinitiator concentrations. Sublimation ofbenzophenone from the film samples did not prove significant. The dissolved PEO film, with the added photoinitiator, benzophenone should be handled under protection from light to avoid polymer scission. The dissolved PEO solution with the added photoinitiator was handled under red light. The PEO disks were also stored in the dark. The dissolved PEM film containing the photoinitiator benzophenone was not noticeably degraded under ambient light and did not need to be handled under protection from light. The UV absorptivity by PEO and PEM disks, not containing a photoinitiator, is relatively low when the frequency range of the UV source is 250–300 nm.

Disks were sealed in 1 inch diameter quartz tubes under an inert atmosphere and placed into a rotating UV reactor fitted with Hg vapor tubes. The UV wavelength can vary from 190 nm–350 nm. For example, a 0.4 mm thick disk containing 0.5% benzophenone had a preferred wavelength of about 254 nm. The intensity of the UV radiation needed was dependent on whether: a photoinitiator was used; the concentration of the photoinitiator; and the thickness of the PEO or PEM film used. The irradiation time also varies but should be for at least 15 seconds, however, the PEO and PEM disks were generally irradiated for a time of about 5 minutes to about 70 hours. Sample PEO or PEM film were be flipped midway through the irradiation to promote even exposure. The degree of cross-linking and therefore, the mechanical properties of the films, may be controlled by adjusting the film thickness, irradiation time, and photoinitiator concentration.

Following irradiation, the photoinitiator and the low molecular weight by-products were removed by washing the sample in a polar organic solvent, for example: acetone; chloroform; acetonitrile; or dimethyl sulfoxide.

The mole percent crosslinkage of ethoxy units in PEO or PEM films was determined by swelling tests. The irradiated PEO or PEM films are placed in deionized water and swell isotropically relative to the extent of cross-linkage. The Flory-Rehner relation was employed to derive the cross-link density. The interaction parameter for linear PEO with water of 0.45 was also employed in the calculations. Cross-link densities were reported in moles/liter and mole percent. Mole percent refers to the percentage of ethoxy units cross-linked in the PEO or PEM film samples. The swelling tests indicated that the cross-link density was greatest near the disk surface and was significantly less at the disk center. Therefore, the cross-link density was a sample average and was referred to as the mean cross-link density. Table 1 is a chart of the sample compositions, irradiation times, volume increase by water swelling, and their corresponding mean cross-link densities.

TABLE 1

Sample Compositions, Irradiation Times, Volume Increase by Water Swelling, and Mean Cross-link Densities Determined Using the Flory-Rehner Relation[12]

| Sample No. | Composition | Irradiation Time (h) | Volume Increase | Mean Cross-link Density (Mol/L) | Mean Cross-link Density (Mol %) |
|---|---|---|---|---|---|
| 1 | PEO | 1.0 | Soluble | — | — |
| 2 | PEO | 1.7 | 79 | 0.0006 | 0.006 |
| 3 | PEO | 30 | 35 | 0.0091 | 0.033 |
| 4 | PEO | 66 | 5.1 | 0.57 | 2.1 |
| 5 | PEM | 24 | 40 | 0.007 | 0.03 |
| 6 | PEM | 48 | 35 | 0.009 | 0.04 |
| 7 | PEO + 0.5% BzPh | 0.08 | 3.8 | 1.2 | 4.5 |
| 8 | PEO + 0.5% BzPh | 0.75 | 3.5 | 1.5 | 5.5 |
| 9 | PEO + 0.5% BzPh | 5 | 3.3 | 1.8 | 6.6 |
| 10 | PEO + 0.5% BzPh | 0.08 | 6.3 | 0.33 | 1.2 |
| 11 | PEO + 0.5% BzPh | 1.0 | 4.9 | 0.62 | 2.2 |
| 12 | PEO + 0.5% BzPh | 6 | 4.5 | 0.77 | 2.8 |
| 13 | PEO + 0.5% BzPh | 31 | 6.8 | 0.28 | 1.0 |
| 14 | PEM + 0.5% BzPh | 0.75 | Soluble | — | — |
| 15 | PEM + 0.5% BzPh | 3 | 16 | 0.045 | 0.31 |
| 16 | PEM + 0.5% BzPh | 6 | 12 | 0.074 | 0.39 |
| 17 | PEM + 0.5% BzPh | 13 | 9.4 | 0.13 | 0.52 |

The thermal transitions of irradiated film samples were essentially unchanged from those of the uncross-linked polymers. Glass transition temperatures for all PEO and PEM film samples were between −60° C. and −62° C., and melting endotherms were observed between 53° and 57° C. for PEO sample films. A small low temperature shoulder on the melting endotherm was visible for some cross-linked PEO sample films.

Variable temperature impedance measurements were performed using a computer-controlled impedance analyzer and an environmental chamber. Sample films of PEO and PEM were prepared as pressed disks, placed between two stainless-steel electrodes in an air-tight Kel-F cell and annealed at 70° C.

DSC measurements were obtained at a heating rate of 10K/min. Sample films of PEO and PEM were loaded in an inert atmosphere into hermetically sealed pans. All sample films were quenched from above the melting point prior to measurement. Thermal transitions were recorded at the onset points. $^{1}H$ and $^{13}C$- NMR spectra of uncross-linked and cross-linked polymers were obtained using a Bruker 300 MHz instrument. IR spectra of PEO and PEM films were obtained by FTIR.

The frequency dependence of the dynamic modulus was consistent with the swelling test. The dynamic modulus was measured in oscillatory shear between parallel plates in a rheometer. Disks were cut of the irradiated PEO and PEM films, then pressed to the diameter of the plates. Sample PEO and PEM films were held in the plates with a light, between 100–1000 g, compressive force to ensure good contact and to prevent slipping of the sample on the plates. Measurements were made at strain amplitudes of 0.03 or less. The temperature of the sample films was controlled using a convection oven. Nitrogen was used in the oven to prevent oxidation.

The dynamic modulus data for each film sample were plotted as master curves, according to the time-temperature superposition principle. The dynamic modulus varied through the thickness, and the reciprocal of the apparent or measured modulus was the reciprocal of the actual modulus integrated through the thickness of the film. Liquid behavior was readily distinguished from solid behavior.

Contrary to the degree of cross-linking as measured by swelling, the dynamic modulus data indicated that upon irradiation the PEO film initially underwent softening, then cross-links into a network with a monotonic increase in cross-linking with increasing irradiation time. With sufficient cross-linking the PEO becomes a stiff elastomer.

The temperature dependence of the apparent dynamic modulus was studied and showed Arrhenius behavior.

Having described the preferred embodiments of this invention, it will now be apparent to one of skill in the art that other embodiments incorporating its concept may be used. It is felt, therefore, that this invention should not be limited to the disclosed embodiments, but rather should be limited by the spirit and scope of the appended claims.

What is claimed is:

1. A method of cross-linking poly[oxymethylene-oligo (oxyethylene)] comprising the following steps:

(a) dissolving said poly[oxymethylene-oligo (oxyethylene)] in a sufficient amount of polar organic solvent to form a solution;

(b) casting said solution to form a film;

(c) cutting said film to a predetermined thickness;

(d) drying the film; and (e) irradiating said film with Ultraviolet radiation in a wavelength range from about 190–350 nm for a predetermined amount of time.

2. A method of cross-linking poly[oxymethylene-oligo (oxyethylene)] as claimed in claim 1 wherein said polar organic solvent is selected from the group consisting of: acetone; acetonitrile; chloroform; and dimethyl sulfoxide.

3. A method of cross-linking poly[oxymethylene-oligo (oxyethylene)] as claimed in claim 1 wherein said drying is at about 60° C. in vacuo.

4. A method of cross-linking poly[oxymethylene-oligo (oxyethylene)] as claimed in claim 1 wherein said wavelength is about 254 nm.

5. A method of cross-linking poly[oxymethylene-oligo (oxyethylene)] as claimed in claim 1 further comprising the step of rotating said film 180° at one-half said predetermined time in step (e) to promote even exposure to the Ultraviolet wavelength.

6. A method of cross-linking poly[oxymethylene-oligo (oxyethylene)] as claimed in claim 1 further comprising the step of adding a predetermined amount of a photoinitiator between step (a) and step (b).

7. A method of cross-linking poly[oxymethylene-oligo (oxyethylene)] as claimed in claim 6 wherein said photoinitiator is selected from the group consisting of: benzophenone; 1,2 dibenzoylbenzene; 1,3 dibenzoylbenzene; 1,4 dibenzoylbenzene; and trans,trans dibenzylidene acetone.

8. A method of cross-linking poly[oxymethylene-oligo (oxyethylene)] as claimed in claim 6 further comprising the step of washing said film after the irradiation with a polar organic solvent to remove the photoinitiator.

9. A method of cross-linking poly(ethylene oxide) comprising the following steps:

(a) dissolving said poly(ethylene oxide) in a sufficient amount of polar organic solvent to form a solution;

(b) casting said solution to form a film;

(b) cutting said film to a predetermined thickness;

(c) further drying said film;

(d) irradiating the film with Ultraviolet radiation in the wavelength range from about 190–350 nm for a predetermined amount of time.

10. A method of cross-linking poly(ethylene oxide) as claimed in claim 9 wherein said polar organic solvent is selected from the group consisting of: acetone; acetonitrile; chloroform; and dimethyl sulfoxide.

11. A method of cross-linking poly(ethylene oxide) as claimed in claim 9 wherein said drying is at about 60° C. in vacuo.

12. A method of cross-linking poly(ethylene oxide) as claimed in claim 9 wherein said wavelength is about 254 nm.

13. A method of cross-linking poly(ethylene oxide) as claimed in claim 9 further comprising the step of rotating said film 180° at one-half said predetermined time in step (e) to promote even exposure to the Ultraviolet wavelength.

14. A method of cross-linking poly(ethylene oxide) as claimed in claim 9 further comprising the steps of mixing with the dissolved poly(ethylene oxide)a predetermined amount of photoinitiator under essentially dark conditions to avoid chain scission in the poly(ethylene oxide).

15. A method of cross-linking poly(ethylene oxide) as claimed in claim 14 wherein said photoinitiator is selected from the group consisting of: benzophenone; 1,2 dibenzoylbenzene; 1,3 dibenzoylbenzene; 1,4 dibenzoylbenzene; or trans, trans dibenzylidene acetone.

16. A method of cross-linking poly(ethylene oxide) as claimed in claim 14 further comprising the step of washing said film after the irradiation with a polar organic solvent to remove the photoinitiator.

* * * * *